United States Patent
Amaya et al.

(10) Patent No.: US 10,773,459 B2
(45) Date of Patent: Sep. 15, 2020

(54) THREE-DIMENSIONAL SHAPING METHOD

(71) Applicant: Matsuura Machinery Corporation, Fukui, Fukui (JP)

(72) Inventors: Kouichi Amaya, Fukui (JP); Kousuke Ishimoto, Fukui (JP); Takeshi Yamada, Fukui (JP)

(73) Assignee: Matsuura Machinery Corporation, Fukui, Fukui (JP)

(*) Notice: Subject to any disclaimer, the term of this patent is extended or adjusted under 35 U.S.C. 154(b) by 195 days.

(21) Appl. No.: 15/667,268

(22) Filed: Aug. 2, 2017

(65) Prior Publication Data
US 2019/0039314 A1    Feb. 7, 2019

(51) Int. Cl.
*B29C 64/393* (2017.01)
*B29C 64/153* (2017.01)
*B33Y 10/00* (2015.01)
*B33Y 50/02* (2015.01)
*B33Y 40/00* (2020.01)
(Continued)

(52) U.S. Cl.
CPC .......... *B29C 64/393* (2017.08); *B22F 3/1055* (2013.01); *B29C 64/153* (2017.08); *B29C 64/188* (2017.08); *B33Y 10/00* (2014.12); *B33Y 40/00* (2014.12); *B33Y 50/02* (2014.12); *B22F 2003/1057* (2013.01)

(58) Field of Classification Search
CPC ... B29C 64/393; B29C 64/153; B29C 64/188; B33Y 10/00; B33Y 50/02; B33Y 40/00; B22F 2003/1057; B22F 3/1055
See application file for complete search history.

(56) References Cited

U.S. PATENT DOCUMENTS

2004/0026807 A1*  2/2004  Andersson .............. B22F 3/004
                                                           264/40.1
2006/0208396 A1*  9/2006  Abe ...................... B22F 3/1055
                                                           264/497
(Continued)

FOREIGN PATENT DOCUMENTS

JP    2004-277881 A    10/2004

OTHER PUBLICATIONS

Thermographic camera. In Wikipedia, the Free Encyclopedia. Retrieved Feb. 13, 2020, from https://en.wikipedia.org/w/index.php?title=Thermographic_camera&oldid=935302777 (Year: 2020).*

*Primary Examiner* — Michael M. Robinson
(74) *Attorney, Agent, or Firm* — Richard M. Goldberg

(57) ABSTRACT

A three-dimensional shaping method utilizing a powder layer forming step, and a sintering step with a laser beam or electron beam, the method including the steps of a) measuring a light intensity of sparks and photographing the sparks generated with fly-off of powder caused by irradiation of the beam over the entire periphery of the sintering region, b) commanding to continue sintering within the next time unit or the next powder layer forming step, when it is detected that the region width and light intensity are within the standard ranges for a given time unit, and c) commanding to cancel sintering in the next time unit or the next powder layer forming step when a sintering defect has occurred, when it is detected that a condition has occurred in which the region width and light intensity deviate from the standard ranges for a given time unit.

16 Claims, 7 Drawing Sheets

(51) Int. Cl.
 *B29C 64/188* (2017.01)
 *B22F 3/105* (2006.01)

(56) References Cited

U.S. PATENT DOCUMENTS

2013/0343947 A1    12/2013  Satzger et al.
2018/0050494 A1*    2/2018  Coeck .................... B33Y 10/00

* cited by examiner

[Fig. 1]
(a)
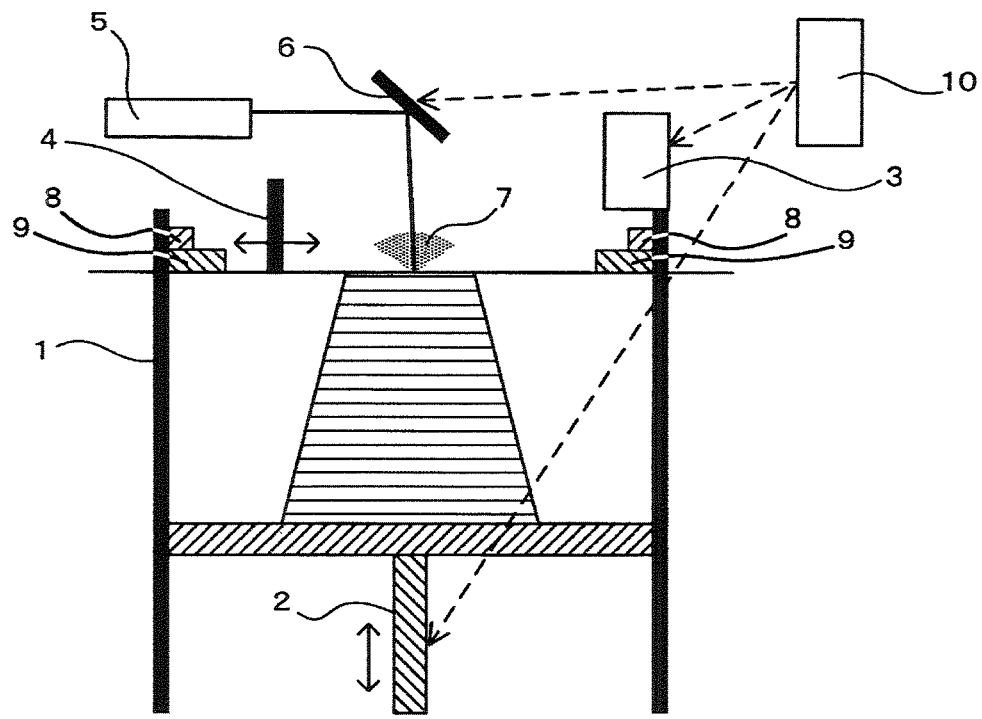
(b)
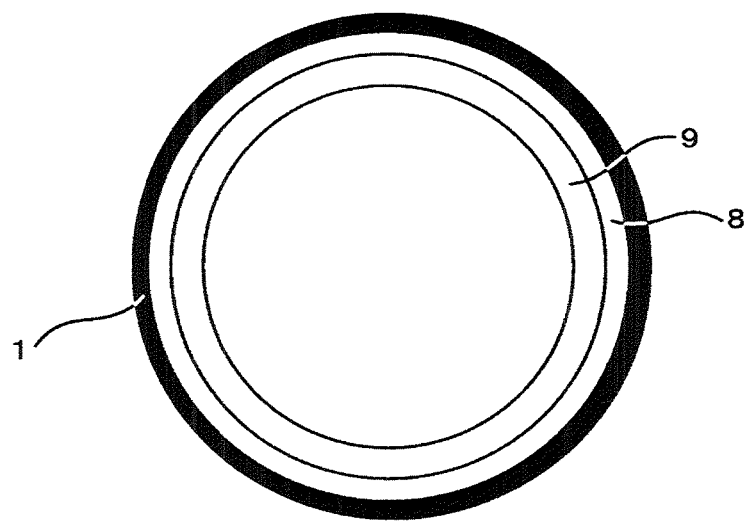

[Fig. 3]
(a)
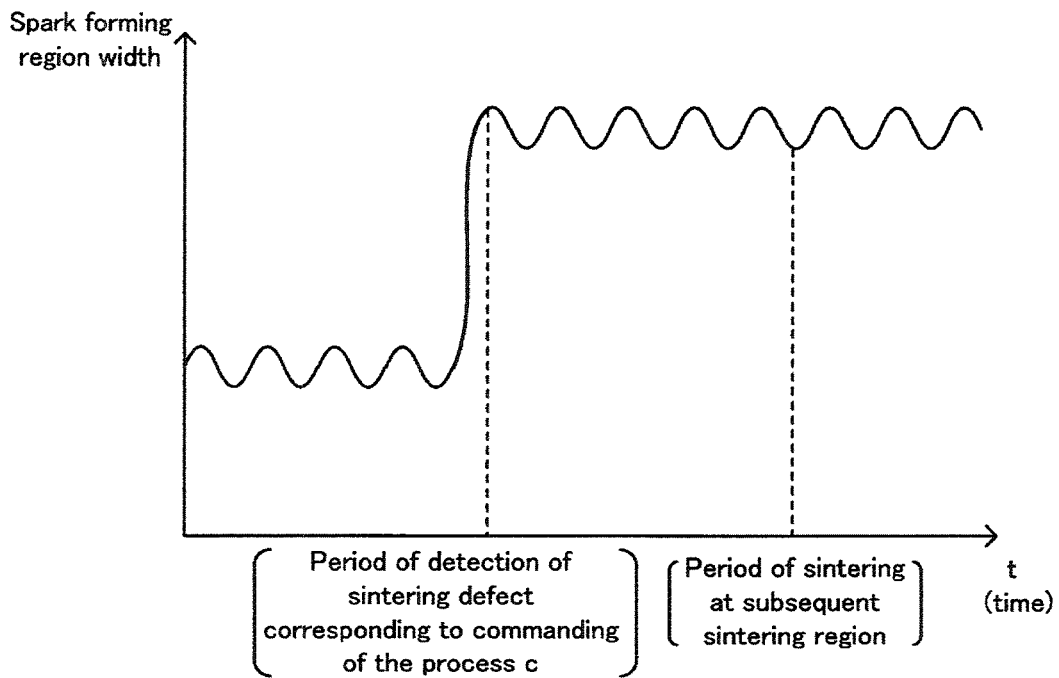
(b)
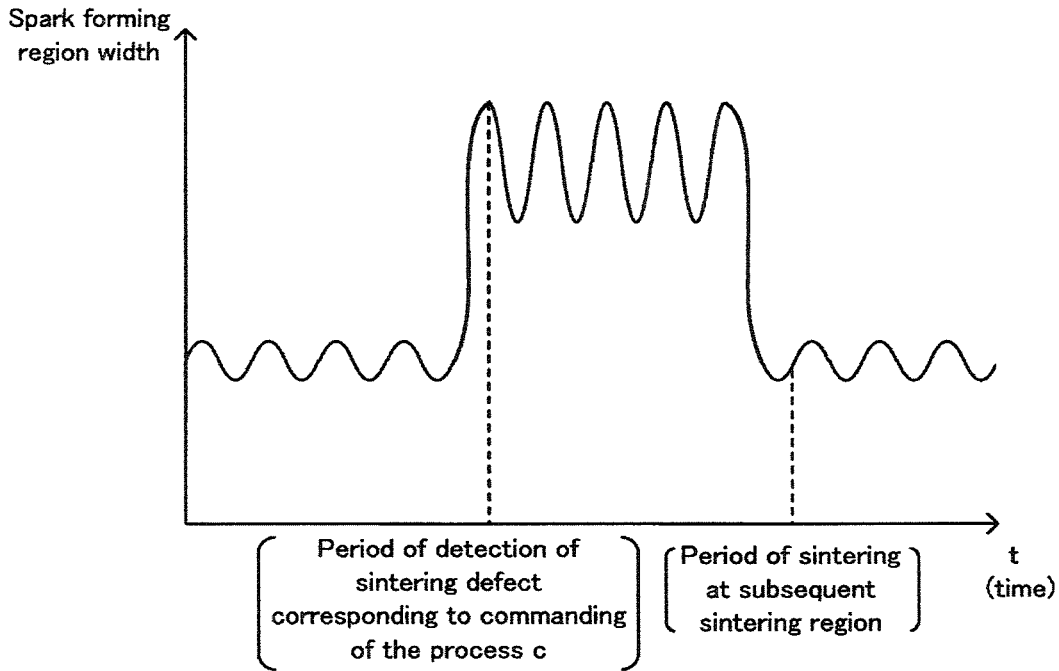

[Fig. 5]

[Fig. 7]

THREE-DIMENSIONAL SHAPING METHOD

TECHNICAL FIELD

The present invention relates to a method for producing a shaped body with a three-dimensional form, by repetition of a powder layer forming step and a sintering step of the powder layer by a laser beam or electron beam.

BACKGROUND ART

In the aforementioned three-dimensional shaping method, it is currently impossible to completely prevent sintering defects, due to the following reasons:

A. A problem with the control system involved in irradiating the laser beam or electron beam onto the powder layer may result in an excess or insufficiency of the supplied beam, forming a non-flat sintering surface with a generally regular uneven condition, compared to when each beam is supplied normally, B. Due to formation of the uneven condition of above A or infiltration of chips, during formation of the powder layer, squeegee movement is hampered and it becomes difficult to achieve a uniform flat surface, or joining between the previously sintered layer and the newly sintered layer by melting may be incomplete, causing abnormalities in the powder layer surface that result in a non-flat powder layer surface with an irregular uneven condition.

However, since in a three-dimensional shaping method the laminating and sintering steps are repeated in a sealed apparatus, it is unavoidable that such sintering defects as mentioned in above A and B will be overlooked and only noticed after completion of all of the laminating steps and all of the sintering steps that have been repeated.

When a laser beam or electron beam has been irradiated onto the powder layer surface, sparks are constantly generated as the powder flies off (sputtering), as shown in FIG. 7.

When a sintering defect has occurred according to above A or B, the sparks are known to exhibit a pattern different from normal sintering, as an empirical rule.

In the prior art, however, the technical concept of focusing on the sparks generated during sintering to detect sintering defects has not been disclosed in any way.

Incidentally, in Patent Document 1, the sparks that are generated as powder flies off during three-dimensional shaping are merely considered to be a cause of abnormal shaping.

Moreover, no publicly known technical publications other than Patent Document 1 can be found that focus on the sparks generated during irradiation with different beams and that attempt to actively make use of those sparks in three-dimensional shaping.

PRIOR ART DOCUMENTS

Patent Documents

Patent Document 1: Japanese Published Unexamined Patent Application No. 2004-277881

SUMMARY OF INVENTION

Technical Problem

The present invention provides a three-dimensional shaping method that focuses on the sparks generated with fly-off of powder (sputtering) during irradiation of a laser beam or electron beam onto a powder layer and that rapidly detects sintering defects, with the aim of preventing generation of defective three-dimensional shaped products due to inclusion of sintering defect regions.

Solution to Problem

In order to solve the aforementioned problems, the present invention has the following basic configurations.

(1) A three-dimensional shaping method that includes lamination comprising alternatively repeating a powder layer forming step and a sintering step in which the powder layer is sintered by irradiation of a moving laser beam or electron beam, wherein the following process is adopted during the sintering step.

a. Measuring the sparks generated with fly-off of powder caused by irradiation of a laser beam or electron beam over the entire periphery of the sintering region are photographed and the light intensity of the sparks, b. commanding to continue the sintering step for the next time unit or the next powder forming step is given, when, in a time unit within the time necessary for each sintering step, it has been detected that the width of the spark forming region photographed according to the process a and the light intensity of sparks measured according to the process a do not deviate from the respective ranges of the standard for the region width and the standard for the light intensity in which no sintering defect occurs, c. commanding to cancel the sintering step for the next time unit or the next powder forming step is given under judging that a sintering defect has occurred, when, in a time unit within the time necessary for each sintering step, it has been detected that the width of the spark forming region photographed according to the process a or the light intensity of sparks measured according to the process a deviates from the respective ranges of the standard for the region width or the standard for the light intensity in which no sintering defect occurs, d. photographing the spark forming regions at the sintering region in which a sintering defect that resulted in commanding of the process c was generated, and at the sintering region within the subsequent time unit, e. judging that the cause of the sintering defect resulted in commanding in the process c is a problem with the control system related to the laser beam or electron beam, when each spark forming region width in the process d is unchanged or changes only gradually, and judging that the cause of the sintering defect resulted in commanding in the process c is a problem with the powder layer surface, when each spark forming region width in the process d changes rapidly.

(2) A three-dimensional shaping method that includes lamination comprising alternatively repeating a powder layer forming step and a sintering step in which the powder layer is sintered by irradiation of a moving laser beam or electron beam, wherein the following process is adopted during the sintering step.

a. Measuring the sparks generated with fly-off of powder caused by irradiation of a laser beam or electron beam over the entire periphery of the sintering region are photographed and the light intensity of the sparks.

b. commanding to continue the sintering step for the next time unit or the next powder forming step is given, when, in a time unit within the time necessary for each sintering step, it has been detected that the width of the spark forming region photographed according to the process a and the light intensity of sparks measured according to the process a do not deviate from the respective ranges of the standard for the region width and the standard for the light intensity in which no sintering defect occurs, c. commanding to cancel the sintering step for the next time unit or the next powder forming step is given under judging that a sintering defect has occurred, when, in a time unit within the time necessary for each sintering step, it has been detected that the width of the spark forming region photographed according to the process a or the light intensity of sparks measured according to the process a deviates from the respective ranges of the standard for the region width or the standard for the light intensity in which no sintering defect occurs, f. recording the light intensities of sparks at the sintering region where the sintering defect that was the cause of commanding in the process c has occurred, and at the sintering region within the subsequent time unit, and further, g. judging that the cause of the sintering defect resulted in commanding in the process c is a problem with the control system related to the laser beam or electron beam, when each light intensity in the process f is unchanged or changes only gradually, and judging that the cause of the sintering defect is a problem with the powder layer surface, when each light intensity in the process f changes rapidly.

Advantageous Effects of Invention

With the basic configurations (1) and (2), the sintering step in the next time unit, or the next powder forming step, can be canceled by detection of a sintering defect with commanding of the process c, making it possible to prevent unnecessary steps of further lamination and sintering after a sintering defect has occurred, and to thus avoid generation of defective three-dimensional shaped products that include sintering defect regions.

Moreover, when the cause of a sintering defect has been identified and corrected, and the entire sintering region in which the sintering defect has occurred, or that entire region and the already laminated sintering regions, are removed by melting or softening, or all of the entire sintering regions are removed with a cutting tool, and a new laminating step and sintering step are repeated, it is possible to efficiently carry out production of a three-dimensional shaped product despite generation of the sintering defects.

BRIEF DESCRIPTION OF DRAWINGS

FIG. 1 is a schematic diagram of an apparatus for carrying out the three-dimensional shaping method of the invention, (a) is a lateral cross-sectional view and (b) is a plan view showing the configuration of an apparatus that photographs the region in which sparks are generated and measures the light intensity of the sparks.

FIG. 3 is a pair of graphs showing time-dependent transition of the spark forming region width, (a) shows the state of change in the region width due to a problem with control according to A under Background Art, and (b) shows the state of change in the region width due to a problem with the powder layer surface according to B under Background Art.

FIG. 7 is a photograph showing generation of sparks on the powder layer surface, caused by irradiation of a laser beam or electron beam in a container (vessel) in which three-dimensional shaping is carried out.

DESCRIPTION OF EMBODIMENTS

Figure 2:
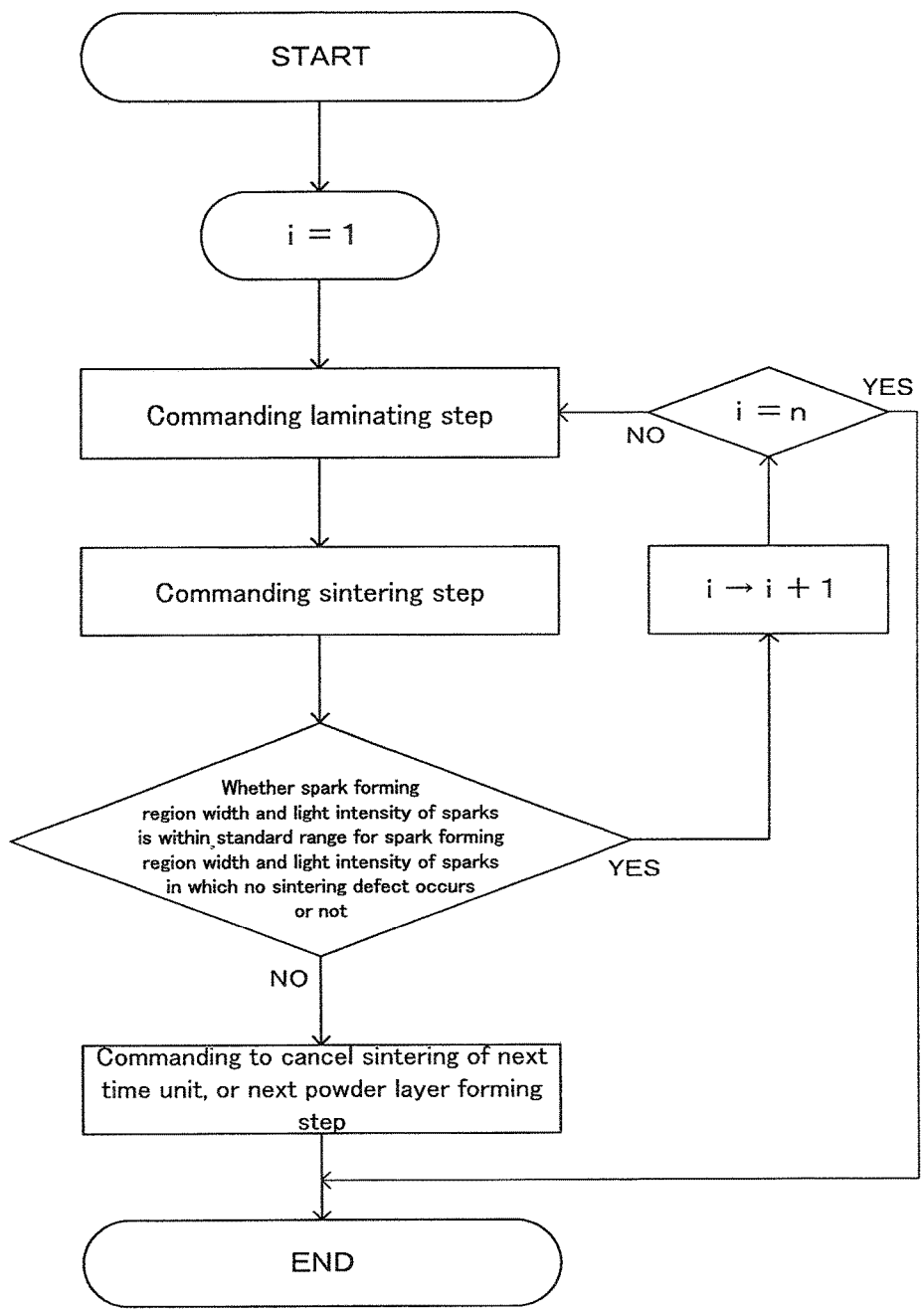
FIG. 2 is a flow chart representing processes a, b and c of basic configurations (1) and (2).

According to basic configurations (1) and (2), as shown in FIG. 1, the construction is the same as the prior art in requiring a table 2 that supports powder to be laminated and a sintered product from the powder in a container (vessel) 1, a powder supply device 3 for the container 1, a squeegee 4 used to flatten the provided powder, a laser beam or electron beam supply source 5 and a scanner device 6 capable of moving the beams, and a controller 10, but it also comprises a spark photographing apparatus 8 and a measuring apparatus 9 for measurement of light intensity by sparks, around the entire periphery of the sintering region.

As sparks are generated on the sintering surface, the spark photographing apparatus 8 and the measuring apparatus 9 for measurement of light intensity by sparks are installed in a region higher than the sintering surface.

Note that the measuring apparatus 9 for measurement of light intensity may use either luminosity or illuminance of light by the sparks as standard.

In order to evaluate the region width and light intensity in the processes b and c of basic configurations (1) and (2), the time unit is set to be within each sintering step, the reason being for more efficient evaluation, since it is very cumbersome and also meaningless to perform evaluation for each measurement.

The time unit also includes cases where it is the time of each sintering step, but it may also be selected as a time that is $\frac{1}{10}$ to $\frac{1}{2}$ of that time.

The processes a, b and c of basic configurations (1) and (2) are shown in the flow chart of FIG. 2, prescribing that when no sintering defect has occurred and the spark forming region width and the light intensity of sparks are within the ranges previously set as standard, then commanding is given to continue sintering for the next time unit, or the next powder layer forming step, as is described in the process b, but when a sintering defect has occurred and the spark forming region width or light intensity of sparks is outside of the range previously set as the standard, i.e. it is either larger than or smaller than the standard range, then sintering for the next time unit, or the next powder layer forming step, is canceled, as is described in the process c.

The standard range when no sintering defect has occurred is set beforehand for each sintering step, according to data based on the maximum width and minimum width for formation of sparks when it has been confirmed that no sintering defects have occurred, and the maximum and minimum luminosity or illuminance of light intensity, for each sintering step.

The basis for selecting cancellation as in the process c when the spark forming region width and the light intensity of sparks as measured according to the process a deviate from the aforementioned standard ranges, is as follows.

When a problem with control of the laser beam or electron beam has occurred according to A under Background Art and the beams exceed the proper amount to avoid occurrence of sintering defects, the spark forming region width based on the photograph in the process a will exceed the prescribed image range, and likewise the light intensity measured in the process a will exceed the prescribed numerical range, whereas when the beams are insufficient, the region width will not reach the prescribed image range and the light intensity will by necessity be below the prescribed numerical range.

In either case, whether the beams exceed the proper amount or are insufficient, this means that so long as an essentially regular uneven condition is formed on the sintering surface compared to normal sintering, if the region width deviates from the prescribed image range and the light intensity deviates from the prescribed numerical range, then it was appropriate to select the cancellation in the process c in response to the generation of a sintering defect.

On the other hand, in the case of a problem with the powder layer surface according to B under Background Art, an irregular uneven condition is formed on the abnormal surface, thereby increasing the surface area of powder per unit area in the planar direction (actually the horizontal direction), and therefore the spark forming region width exhibits a larger image width than a normal powder layer surface, and the light intensity of sparks also changes to a larger value compared to a normal powder layer surface, such that the selection in the process c was appropriate.

Moreover, a sintering defect that results in commanding in the process c is due to causes A and B in most cases.

Consequently, it is highly appropriate to issue commanding cancellation for the process c based on the standard range for the spark forming region width and light intensity of sparks when no sintering defects occur, and commanding prevention for the meaningless and futile steps of further repeated lamination and sintering, so that it becomes possible to avoid production of a three-dimensional shaped product with defects.

The image range for the region width when no sintering defects have occurred, and the standard numerical range for the light intensity, are set in the following manner.

In a three-dimensional shaping method, an appropriate laser beam or electron beam intensity range is defined according to the type of object to be shaped.

Thus, the standard for avoiding a uneven condition caused by an abnormal beam supply according to above A can be pre-established by successively increasing and decreasing the normal supplied amount of a laser beam or electron beam from the normal state for the prescribed time unit and at the prescribed measuring position for each type of object to be shaped, with the supply carried out so as to reach the limits for the appropriate uneven condition, and measuring the width of the region in which sparks 7 are formed and the light intensity by the sparks 7 at the limit levels, then determining the maximum just before the supply amount reaches an excessive level and the minimum just before it reaches an insufficient level.

On the other hand, most types of the shaped body with the three-dimensional shaping form are common with each other according to having a normal, i.e. flat powder surface.

With this consideration, the standard for avoiding an abnormal uneven condition according to above B can be pre-established, through separate experiments in which by defining a condition of poor movement of the squeegee 4 that can interfere with obtaining a flat surface, which is caused by infiltration of chips, or an incomplete molten state due to insufficient sintering, during the prescribed time unit or at the prescribed measuring position, the degree of irregularity and the degree of incompleteness are gradually reduced, by confirming the border levels for a normal flat condition and an abnormal uneven condition, and measuring the width of the region in which sparks 7 are formed and the light intensity of the sparks 7 at the confirmed levels, then determining the minimum just before an irregular condition is reached.

The region width and the light intensity are in a matching relationship in most cases, such that when the former is in the standard range the latter will be as well, and when the former deviates from the standard range the latter will be as well.

However, it must be noted that in very exceptional cases, this matching relationship does not stand, and the latter may deviate from the standard range even though the former is within the standard range, or the converse may be true.

Therefore, for a continuing commanding in the process b, it is a necessary condition for both to be within their respective standard ranges, while for commanding cancellation in the process c, it is a necessary condition for at least one to deviate from its standard range.

Note that in the flow chart in FIG. 2, for distinguishing between the processes b and c, it is judged whether or not the region width and the light intensity are within the standard ranges, but if the judgment is negative ("No"), so long as at least one of them deviates from the respective standard range, it is not necessary to judge whether or not the other one also deviates from its respective range.

When a sintering defect that results in commanding of the process c has occurred, the cause thereof is usually diagnosed.

In order to diagnose the cause of the sintering defect, the following process may be adopted according to basic configuration (1).

d. photographing the spark forming regions at the sintering region in which a sintering defect that resulted in commanding of the process c was generated, and at the sintering region within the subsequent time unit, e. judging that the cause of the sintering defect resulted in commanding in the process c is a problem with the control system related to the laser beam or electron beam, when each spark forming region width in the process d is unchanged or changes only gradually, and judging that the cause of the sintering defect resulted in commanding in the process c is a problem with the powder layer surface, when each spark forming region width in the process d changes rapidly.

The judgment of the process e is based on the following.

When above A is a sintering defect caused by a problem relating to the control system, the laser beam or electron beam is either in an excessive or a deficient state, and the state of excess or deficiency continues, such that the region width will exhibit either no change (also including no change in approximate terms, i.e. essentially no change), or only a small change, even with a different sintering region.

Consequently, as shown in FIG. 3(a), the region width for the subsequent sintering region will exhibit either no change or only a small change compared to the region width at the region of the sintering defect that resulted in commanding in the process c, as according to the process d.

In contrast, when a problem with the powder layer surface is the cause of the sintering defect, as according to above B, the region of the sintering defect is not necessarily continuous, and the uneven condition of the powder layer is irregular.

Consequently, when the sintering region where the region width was photographed after the sintering region in which the sintering defect that resulted in commanding in the process c has occurred still remains as a sintering defect, the irregular uneven condition will clearly differ from the uneven condition of the original sintering defect, and the aforementioned region widths will also differ.

On the other hand, when the sintering defect has already disappeared in the next sintering region, the region width clearly differs from the original region width corresponding to commanding in the process c, so long as it is within the standard range according to the process b.

Consequently, as shown in FIG. 3(b), the region width at the subsequent sintering region changes rapidly with respect to the region width at the sintering region in which the sintering defect that resulted in commanding in the process c has occurred.

Thus, due to the distinct difference in transition of the region width between the case of above A and the case of above B, the change in the spectral image also differs, and a judgment according to the process e can be made.

The judgment according to the process e can be made visually based on the state of change between the region width corresponding to the sintering defect that resulted in commanding in the process c and the region width corresponding to the subsequent sintering region.

However, a prescribed numerical control is necessary if the judgment is to be automated and displayed.

Figure 4:
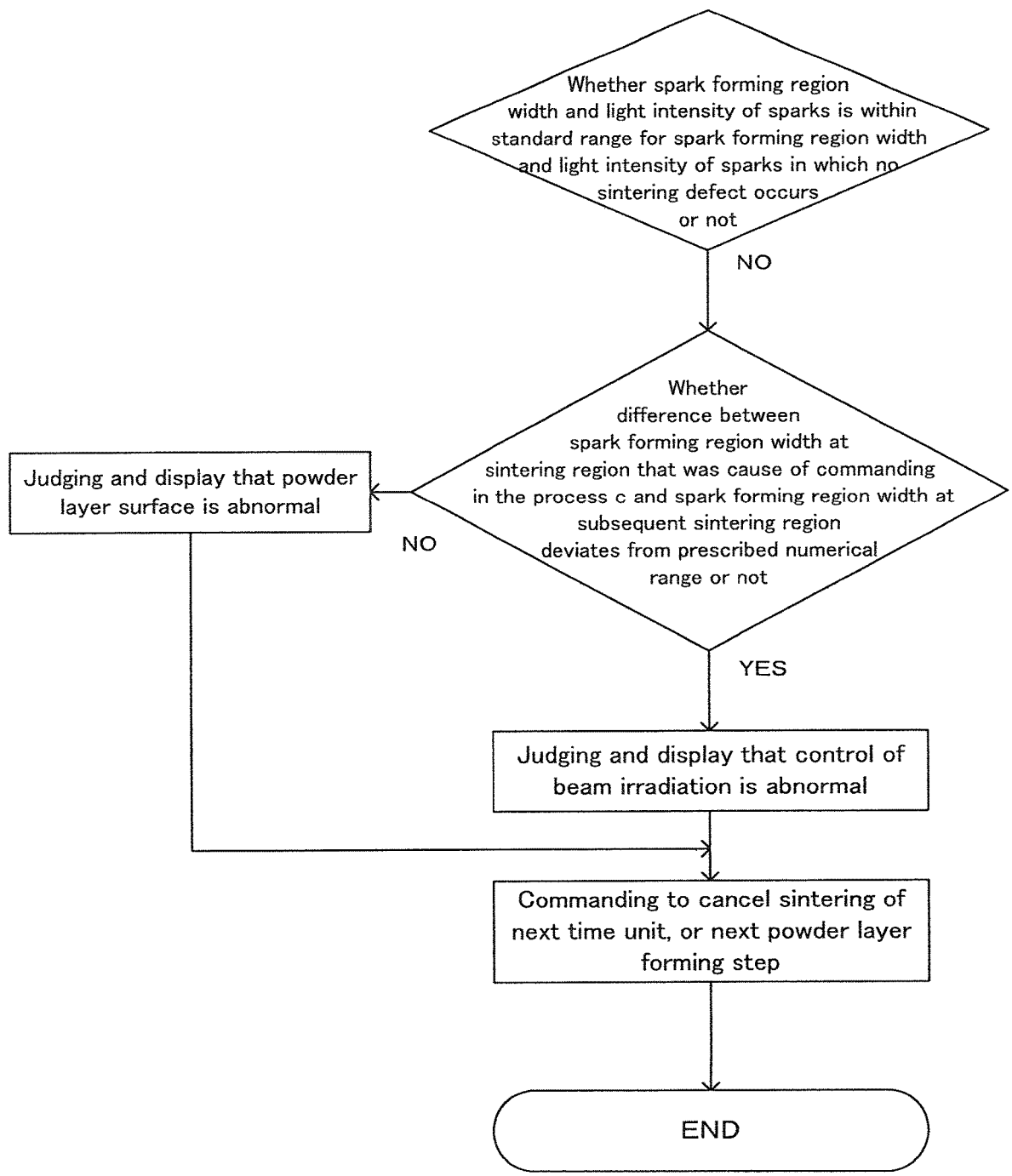
FIG. 4 is a flow chart relating to carrying out processes d and e of basic configuration (1), based on differences in the state of change as shown in FIG. 3.

Therefore, an embodiment may be adopted as shown in the flow chart of FIG. 4, such that, among the spark forming region widths of the process d, if the difference between the spark forming region width at the sintering region where the sintering defect that resulted in commanding of the process c has occurred and the spark forming region width at one sintering region among the subsequent sintering regions, is within the prescribed numerical range previously set as the distinguishing standard, then it is judged and displayed that the cause of the sintering defect that resulted in commanding in the process c is a problem with the control system relating to the laser beam or electron beam, while if the difference deviates from the prescribed numerical range previously set as the distinguishing standard, then it is judged and displayed that the cause of the sintering defect is a problem with the powder layer surface.

The previous setting of the prescribed numerical range as a standard can be accomplished by photographing in advance the width of the region in which sparks are formed with fly-off of powder, for each sintering step at multiple positions during each time unit when the problem with the control system relating to the laser beam or electron beam as according to A is at its maximum state, and creating the data for the state of change in the region width in advance, and then for the actual judgment, using the numerical value for the ratio or difference between the region widths of the two sintering regions.

This numerical value will also differ depending on the material of the object to be shaped, the radiation intensity of each beam and the performance of the measuring apparatus that measures the region width and light intensity, and it is impossible to specify the numerical range for the standard range in a general manner.

In order to diagnose the cause of the sintering defect, the following process may be adopted according to basic configuration (2).

f. Recording the light intensities of sparks at the sintering region where the sintering defect that was the cause of commanding in the process c has occurred, and at the sintering region within the subsequent time unit, and further, g. judging that the cause of the sintering defect resulted in commanding in the process c is a problem with the control system related to the laser beam or electron beam, when each light intensity in the process f is unchanged or changes only gradually, and judging that the cause of the sintering defect is a problem with the powder layer surface, when each light intensity in the process f changes rapidly.

The following is the reasoning under which judging according to the process g can be made by recording the light intensity as in the process f.

As explained for photographing in the process d and judging in the process e, when the cause is above A, the state of generation of sparks accompanying fly-off of powder is either unchanged (also including unchanged in approximate terms, i.e. essentially unchanged), or only slightly changed.

Figure 5:
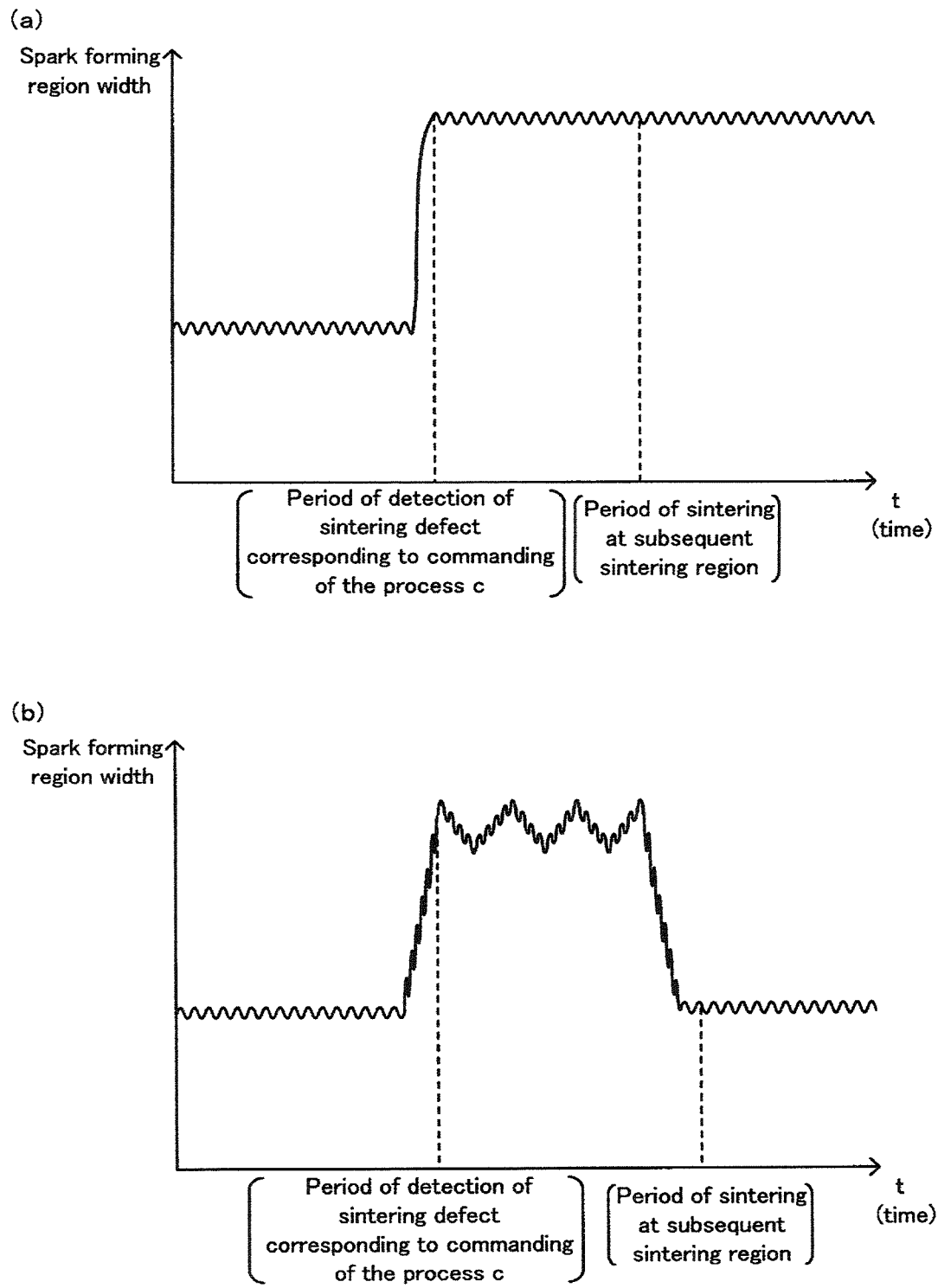
FIG. 5 is a pair of graphs showing time-dependent transition of the light intensity of sparks, (a) shows the state of change in the light intensity in the case of a problem with the control system according to A under Background Art, and (b) shows the state of change in the light intensity in the case of a problem with the powder layer surface according to B under Background Art.

As a result, the light intensity of sparks also exhibits either no change or only a small change, as shown in FIG. 5(a).

In contrast, when the cause is above B, the uneven condition of the powder layer surface changes rapidly, and as a result the light intensity at the sintering region that was the cause of commanding in the process c and the light intensity at the subsequent sintering region both change rapidly as shown in FIG. 5(b).

Thus, the case of above A and B can be judged according to the process g based on the clear difference in the transition of the change in light intensity.

Judging according to the process g can be made visually based on the state of change between the light intensity for the sintering defect that resulted in commanding in the process c and the light intensity in the subsequent sintering region.

However, a prescribed numerical control is necessary in order for the judgment to be automated and displayed.

Figure 6:
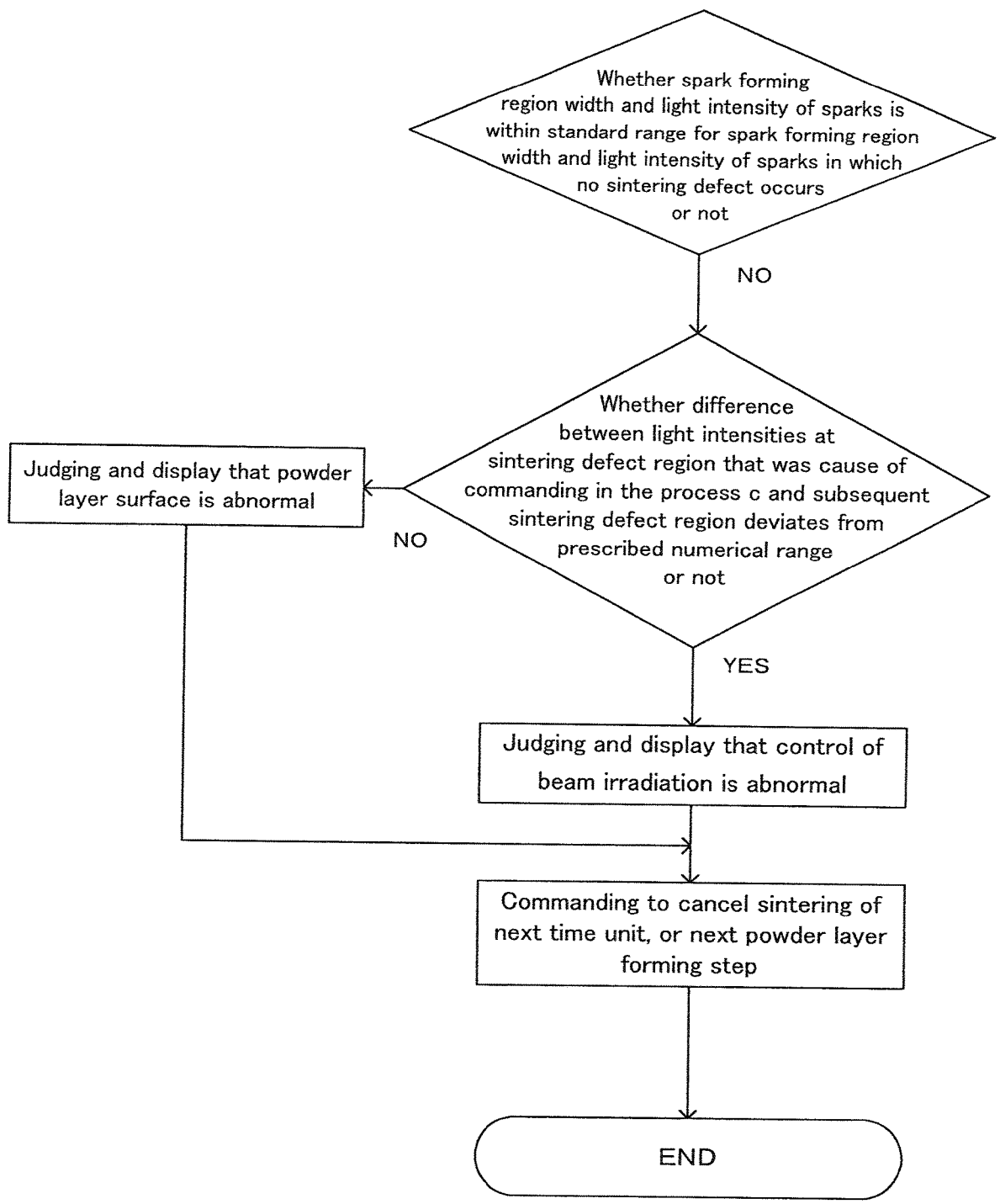
FIG. 6 is a flow chart relating to carrying out processes f and g of basic configuration (2), based on differences in the state of change as shown in FIG. 5.

Therefore, an embodiment may be adopted as shown in the flow chart of FIG. 6, such that, among the light intensities of the process f, if the difference between the light intensity at the sintering region where the sintering defect that resulted in commanding of the process c has occurred and the light intensity at one sintering region among the subsequent sintering regions, is within the prescribed numerical range previously set as the distinguishing standard, then it is judged and displayed that the cause of the sintering defect that resulted in commanding in the process c is a problem with the control system relating to the laser beam or electron beam, while if the difference deviates from the prescribed numerical range previously set as the distinguishing standard, then it is judged and displayed that the cause of the sintering defect is a problem with the powder layer surface.

The previous setting of the prescribed numerical range as a standard can be accomplished by creating the data for the transition of the light intensity for the time unit of each sintering step, when the problem with the control system relating to the laser beam or electron beam as according to A is at its maximum state, and then for the actual judgment, using the numerical value standard for the ratio or difference relating to the sintering intensities for the two sintering regions.

This numerical value will also differ depending on the material of the object to be shaped, the radiation intensity of each beam and the performance of the measuring apparatus that measures the region width and light intensity, such that it is impossible to specify the numerical range for the standard range in a general manner.

A description will be given as below according to Examples.

Example 1

For Example 1, the entire sintering region including the sintering region in which the cause of a sintering defect has been corrected and commanding in the process c has been carried out, or that entire sintering region and the entire sintering region that has already been laminated below that region, is melted or softened by a laser beam or electron beam, and then only the portion of the thickness of the melted or softened region, or the portion of the thickness of the sintered and laminated sintering region is removed, or alternatively the entireties of each of those sintering regions are removed with a cutting tool, and the laminating step and sintering step are repeated from the freshly removed regions.

As an explanation in terms of the technical gist of Example 1, even though the position of the sintering defect that was the cause of commanding in the process c, and its proximity, has been melted and removed with the laser beam or electron beam, new lamination and sintering in that region requires image analysis of the melted and removed region and new lamination and sintering based on that analysis.

However, it is highly complicated and inefficient to perform such image analysis, and to carry out the powder layer forming step and sintering step in a local region based on the image analysis.

Therefore, in Example 1, the entire sintering region including the position in which the sintering defect has been produced by each beam, or not only that entire sintering region, but also the entire sintering region that has already been formed, are melted, and then based on precise dimensional measurement, the portion of the thickness of the sintering region is removed, or alternatively the portion of the thickness of that entire region and the entire sintering region that has already been formed below it, are removed, then continuously carrying out the new lamination and sintering.

In the case of Example 1, it is possible to effectively utilize the sintered layer that has already been formed, except for the region that is melted and removed in this manner, so that a three-dimensional shaped product without defects can be produced even when a sintering defect has been detected.

Example 2

For Example 2, a light signal and/or an audio signal indicate the presence of a sintering problem during commanding in the process c.

This configuration allows sintering defects to be rapidly dealt with.

Specifically, if different color light signals are selected or different audio signals are selected depending on whether the cause of the sintering defect is above A or B, it will be possible to rapidly determine and deal with the cause of the sintering defect.

INDUSTRIAL APPLICABILITY

As explained above, in order to make possible production, the present invention allows sintering defects to be rapidly detected of three-dimensional shaped products in an efficient manner, while also preventing production of three-dimensional shaped products with defects, and therefore the invention is useful in all three-dimensional shaping methods.

REFERENCE SIGNS LIST

1: Container (vessel)
2: Table
3: Powder supply device
4: Squeegee
5: Laser beam or electron beam supply source
6: Scanner
7: Spark
8: Spark forming region width photographing apparatus
9: Spark light intensity measuring apparatus
10: Controller

The invention claimed is:

1. A three-dimensional shaping method that includes lamination comprising the steps of:
   alternatively repeating a powder layer forming step and a sintering step in which the powder layer is sintered by irradiation of one of a moving laser beam and electron beam, and wherein the following process is adopted during the sintering step:
   a. measuring a light intensity of sparks and photographing the sparks generated with fly-off of powder caused by irradiation of the beam over the entire periphery of the sintering region and measuring the width of a spark for a time unit that is $1/10$ to $1/2$ of a length of time of each sintering step,
   b. commanding to continue one of the following steps: the sintering step and powder forming step, in response to both:
      (i) a width of a spark forming region photographed according to the step a does not deviate from ranges of a standard for a region width in which no sintering defect occurs and
      (ii) the light intensity of sparks measured according to the step a does not deviate from ranges of a standard for the light intensity in which no sintering defect occurs,
   c.
      c1. commanding to cancel one of the following steps: the sintering step and powder forming step, in response to the width of the spark forming region photographed according to the step a deviates from the ranges of the standard for the region width in which no sintering defect occurs,
      c2. commanding to cancel one of the following steps: the sintering step and powder forming step, in response to the light intensity of sparks measured according to the step a deviates from the ranges of the standard for the light intensity in which no sintering defect occurs,
   d. photographing the spark forming regions at the sintering region in which a sintering defect that resulted in commanding of the step c was generated, and at the sintering region within a subsequent time unit after step c,
   e. judging that the cause of the sintering defect resulted in commanding in the step c is a problem with a control system related to the beam, corresponding to each compared spark forming region width in the step d being one of:
      unchanged and
      changes only gradually, and
   f. judging that the cause of the sintering defect resulted in commanding in the step c is a problem with the powder layer surface, corresponding to each compared spark forming region width in the step d changing rapidly.

2. A three-dimensional shaping method according to claim 1 wherein, among the spark forming region widths of the step d, further comprising the steps of:

corresponding to a case where the difference between the spark forming region width at the sintering region where the sintering defect that resulted in commanding of the step c has occurred and the spark forming region width at one sintering region among the subsequent sintering regions after step c, is within the prescribed numerical range previously set as a distinguishing standard, judging and displaying from kinds of cause that the cause of the sintering defect that resulted in commanding in the step c is a problem with the control system relating to the beam, and corresponding to a case where the difference deviates from the prescribed numerical range previously set as the distinguishing standard, judging and displaying from the kinds of causes that the cause of the sintering defect is a problem with the powder layer surface.

3. A three-dimensional shaping method according to claim 2, further comprising the steps of:

one of melting and softening by one of a laser beam and electron beam one of:
the entire sintering region including the sintering region in which the cause of a sintering defect has been corrected and commanding in the step c has been carried out, and
the entire sintering region and the entire sintering region that has already been laminated below that region, and
then either:
(1) removing:
only the portion of the thickness corresponding to the melted or softened region formed in the entire region, or
the portion of the thickness corresponding to the sintered and laminated sintering region formed in the entire region and the entire region that has already been laminated below that region, or
(2) removing the entireties of each of those sintering regions
with a cutting tool, and
repeating the laminating step and sintering step from the removed regions again.

4. A three-dimensional shaping method according to claim 2, further comprising the step of, during commanding in the step c, indicating the sintering problem by at least one of a light signal and an audio signal.

5. A three-dimensional shaping method according to claim 1, further comprising the steps of:

one of melting and softening by one of a laser beam and electron beam one of:
the entire sintering region including the sintering region in which the cause of a sintering defect has been corrected and commanding in the step c has been carried out, and
the entire sintering region and the entire sintering region that has already been laminated below that region, and
then either:
(1) removing:
only the portion of the thickness corresponding to the melted or softened region formed in the entire region, or
the portion of the thickness corresponding to the sintered and laminated sintering region formed in the entire region and the entire region that has already been laminated below that region, or
(2) removing the entireties of each of those sintering regions
with a cutting tool, and
repeating the laminating step and sintering step from the removed regions again.

6. A three-dimensional shaping method according to claim 1, further comprising the step of, during commanding in the step c, indicating the sintering problem to be cancelled by the commanding by at least one of a light signal and an audio signal.

7. A three-dimensional shaping method according to claim 6, wherein the step of indicating includes indicating the cause of the sintering defect by a color of the light signal.

8. A three-dimensional shaping method according to claim 6, wherein the step of indicating includes indicating the cause of the sintering defect by a plurality of different audio signals.

9. A three-dimensional shaping method that includes lamination comprising the steps of:

alternatively repeating a powder layer forming step and a sintering step in which the powder layer is sintered by irradiation of one of a moving laser beam and electron beam, and wherein the following process is adopted during the sintering step:

a. measuring a light intensity of sparks and photographing the sparks generated with fly-off of powder caused by irradiation of the beam over the entire periphery of the sintering region and measuring the width of a spark for a time unit that is 1/10 to 1/2 of a length of time of each sintering step, b. commanding to continue one of the following steps: the sintering step and powder forming step, in response to both:
(i) a width of a spark forming region photographed according to the step a does not deviate from ranges of a standard for a region width in which no sintering defect occurs and
(ii) the light intensity of sparks measured according to the step a does not deviate from ranges of a standard for the light intensity in which no sintering defect occurs, c.
c1. commanding to cancel one of the following steps: the sintering step and powder forming step, in response to the width of the spark forming region photographed according to the step a deviates from the ranges of the standard for the region width in which no sintering defect occurs,
c2. commanding to cancel one of the following steps: the sintering step and powder forming step, in response to the light intensity of sparks measured according to the step a deviates from the ranges of the standard for the light intensity in which no sintering defect occurs, d. recording the light intensities of sparks at the sintering region where the sintering defect that was the cause of commanding in the step c has occurred, and at a sintering region within a subsequent time unit after step c, e. judging that the cause of the sintering defect resulted in commanding in the step c is a problem with a control system related to the beam, corresponding to each compared light intensity in the step d being one of:

unchanged and changes only gradually, and f. judging that the cause of the sintering defect is a problem with the powder layer surface, corresponding to each compared light intensity in the step d changing rapidly.

10. A three-dimensional shaping method according to claim 9, wherein, among the light intensities of the step d, corresponding to a case where the difference between the light intensity at the sintering region where the sintering defect that resulted in commanding of the step c has occurred and the light intensity at one sintering region among the subsequent sintering regions after step c, is within the prescribed numerical range previously set as the distinguishing standard, judging and displaying from kinds of causes that the cause of the sintering defect that resulted in commanding in the step c is a problem with the control system relating to the laser beam or electron beam, and corresponding to a case where the difference deviates from the prescribed numerical range previously set as the distinguishing standard, judging and displaying from the kinds of causes that the cause of the sintering defect is a problem with the powder layer surface.

11. A three-dimensional shaping method according to claim 10, further comprising the steps of:

one of melting and softening by one of a laser beam and electron beam one of:

the entire sintering region including the sintering region in which the cause of a sintering defect has been corrected and commanding in the step c has been carried out, and the entire sintering region and the entire sintering region that has already been laminated below that region, and then either:

(1) removing:

only the portion of the thickness corresponding to the melted or softened region formed in the entire region, or the portion of the thickness corresponding to the sintered and laminated sintering region formed in the entire region and the entire region that has already been laminated below that region, or (2) removing the entireties of each of those sintering regions with a cutting tool, and repeating the laminating step and sintering step from the removed regions again.

12. A three-dimensional shaping method according to claim 10, further comprising the step of, during commanding in the step c, indicating the sintering problem by at least one of a light signal and an audio signal.

13. A three-dimensional shaping method according to claim 9, further comprising the steps of:

one of melting and softening by one of a laser beam and electron beam one of:

the entire sintering region including the sintering region in which the cause of a sintering defect has been corrected and commanding in the step c has been carried out, and the entire sintering region and the entire sintering region that has already been laminated below that region, and then either:

(1) removing:

only the portion of the thickness corresponding to the melted or softened region formed in the entire region, or the portion of the thickness corresponding to the sintered and laminated sintering region formed in the entire region and the entire region that has already been laminated below that region, or (2) removing the entireties of each of those sintering regions with a cutting tool, and repeating the laminating step and sintering step from the removed regions again.

14. A three-dimensional shaping method according to claim 9, further comprising the step of, during commanding in the step c, indicating the sintering problem by at least one of a light signal and an audio signal.

15. A three-dimensional shaping method according to claim 14, wherein the step of indicating includes indicating the cause of the sintering defect by a color of the light signal.

16. A three-dimensional shaping method according to claim 14, wherein the step of indicating includes indicating the cause of the sintering defect by a plurality of different audio signals.

* * * * *